Dec. 2, 1958 — M. RONNING — 2,862,717
STRAW SPREADER FOR GRAIN HARVESTERS
Filed Oct. 18, 1955 — 2 Sheets-Sheet 1

INVENTOR.
MARTIN RONNING
BY
Carlsen + Hagle
ATTORNEYS

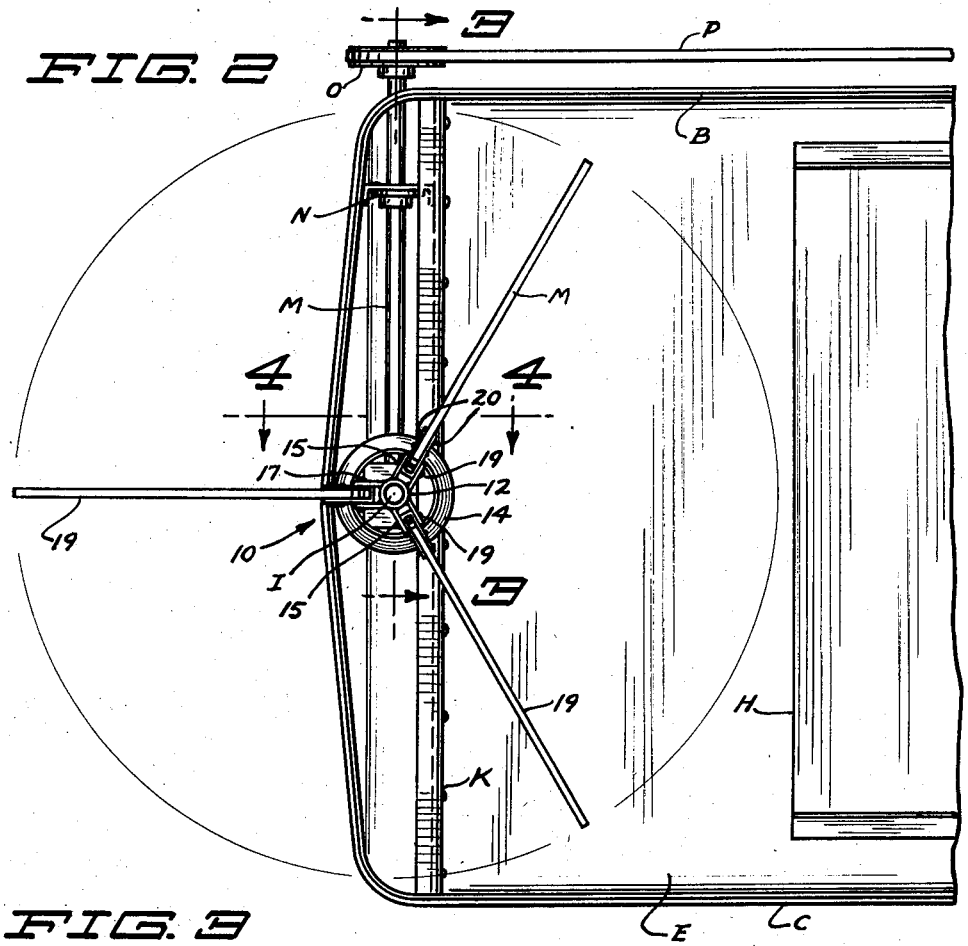
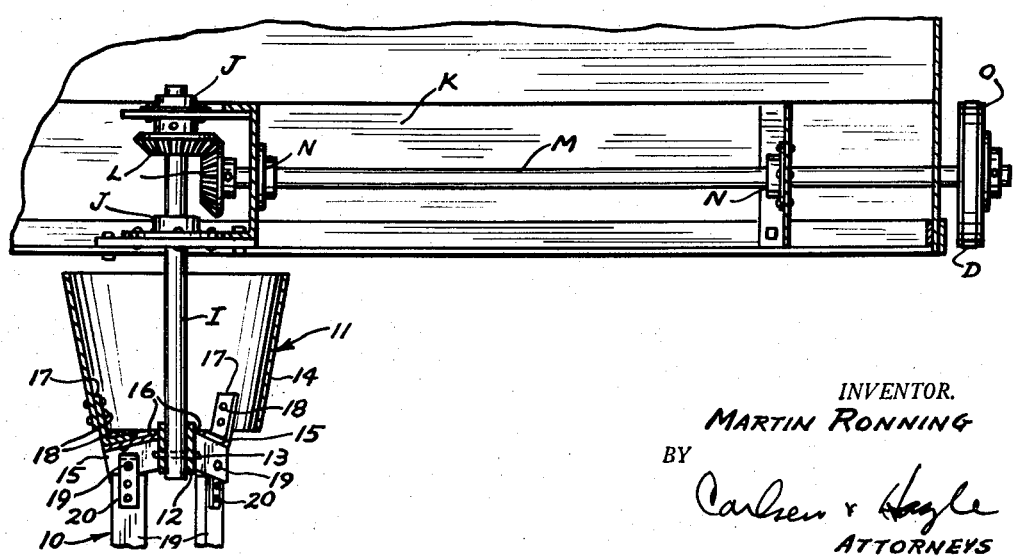

United States Patent Office 2,862,717
Patented Dec. 2, 1958

2,862,717

STRAW SPREADER FOR GRAIN HARVESTERS

Martin Ronning, Minneapolis, Minn., assignor to Minneapolis Moline Company, Hopkins, Minn., a corporation of Minnesota Application October 18, 1955, Serial No. 541,182

4 Claims. (Cl. 275—3)

This invention relates to improvements in straw spreaders for grain harvesters or combines. Such machines include mechanism for threshing the grain from the straw and separately delivering the grain to a tank (or accompanying wagon or truck body) and returning the straw to the field surface. Such mechanism is arranged in a housing forming part of a wheel borne frame which travels over the field, and the housing has a rear hood portion with an opening in its underside through which the straw is discharged downwardly onto the field. This opening is located rearwardly of what are commonly called straw racks which function to shake the straw and separate the last of the grain therefrom, after which the straw falls through the opening as aforesaid. Usually it is desired to spread the straw over the field surface and for this purpose a rotary straw spreader is provided in the opening in the hood, rotatable about an upright axis and having arms or flails to engage and cast the straw outward more or less evenly over the ground. On occasion, however, it is desired to windrow the straw, rather than spread it, in which case it has been the custom to disconnect and remove the straw spreader and let the straw simply fall from the hood opening along a relatively narrow strip as the machine proceeds over the field. This general type of machine is exemplified in my prior Patent No. 1,959,689 which patent discloses all of the component parts of a combine including the straw racks, hood, discharge opening for the straw and straw spreader.

Such straw spreaders have long been, and still are, a source of trouble much of the time. Under ideal conditions they may function effectively but under certain crop conditions, as for example when there are morning glories or other vines in the grain, or the grain itself has long and tangled straw, then the material tends to wind and wrap around the straw spreader causing breakage of the spreader itself, or worse yet when the operator is not particularly alert, so clogging the machine that other and more expensive to replace parts such as the straw racks are damaged. The primary object of my invention, therefore, is to improve the straw spreader so that material will not wind itself thereon, to which end the straw spreading flails or arms are hinged and normally swung downward to clear themselves of crop material, in addition to which the hub member to which the flails are hinged tapers in a downward direction to have a self-clearing action and one discouraging the wrapping of straw, vines, etc., about this part of the spreader.

A further object of my invention and one directly related to that just described is to provide a straw spreader which need not be removed from the combine when it is desired to windrow instead of spread the straw. The same construction which tends to discourage the heretofore so troublesome winding of crop material on the spreader here comes to the fore again, particularly the fact that the flails or arms are so pivoted to the hub member that they will tend to normally and of their own weight swing downward together into a compact bunch, so to speak. For spreading the straw the rotation of the hub member and resultant centrifugal force acting on the flails will swing them upwardly and outwardly to substantially horizontal planes so that they will function just as well as the ordinary spreader, but for windrowing it is only necessary to disconnect or disable the drive to the spreader and the hanging flails will offer little or no obstruction to the windrowing of the straw. Usually the spreader is driven by a belt disposed alongside the rear of the combine and the removal of this belt offers no problem and is certainly easier than removal of the entire spreader as heretofore necessary.

In addition my invention has as an object the provision of a straw spreader which is safer than those now in use which, if the operator is careless, can cause him injury. The swingably mounted free hanging flails of my spreader may, if desired, be made up from flexible relatively soft material since centrifugal force will still straighten them enough to serve their purpose, and should such flexible elements strike the operator it would be with a slapping action rather than the cutting action of present day spreaders.

These and other more detailed and specific objects will be disclosed in the course of the following specification, reference being had to the accompanying drawings, in which—

Fig. 2 is an inverted plan or bottom view, along the line 2—2 in Fig. 1, with the flails shown swung outward in operative positions.

Fig. 3 is a fragmentary enlarged cross section on line 3—3 of Fig. 2 showing the drive and only the upper part of the straw spreader.

Figure 1:
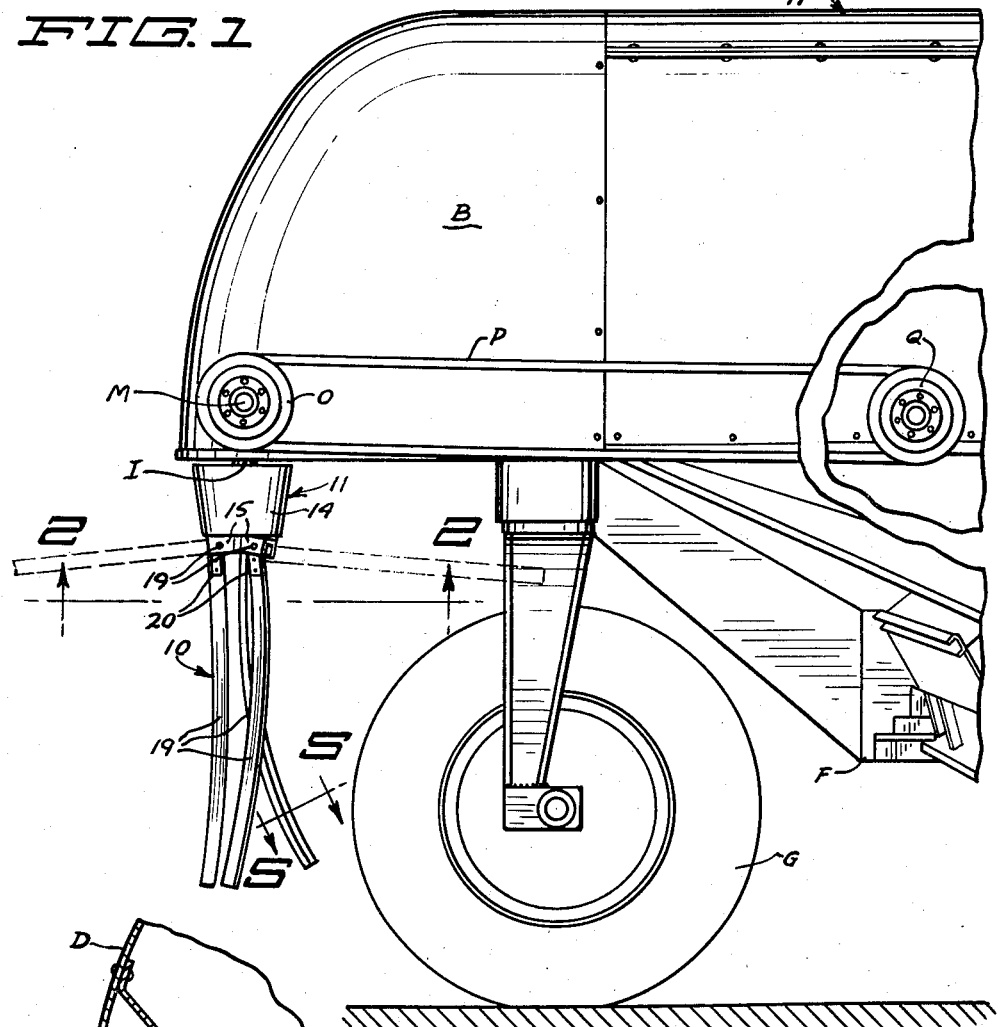
Fig. 1 is a side elevation of the rear portion of a combine showing my improved straw spreader, with the flails in full lines hanging down as they would when inactive and in dotted lines as swung upward and apart into operative positions.

Referring now more particularly and by reference characters to the drawing, A designates generally the housing of a grain harvester or combine, only the rear, hood portion of which is shown and the same has sides B and C, a downwardly curving top D, and a bottom opening E through which the straw from the threshed grain issues. The housing A is supported upon a wheel borne frame F for travel over the field surface and one wheel appears at G. Forwardly of the opening E are the various mechanisms (not here shown) by which the grain is threshed and the kernels separated and separately delivered and the straw finally falls downward through opening E off the rear ends of vibratory straw racks a portion of one of which is seen at H in Fig. 2.

Figure 4:
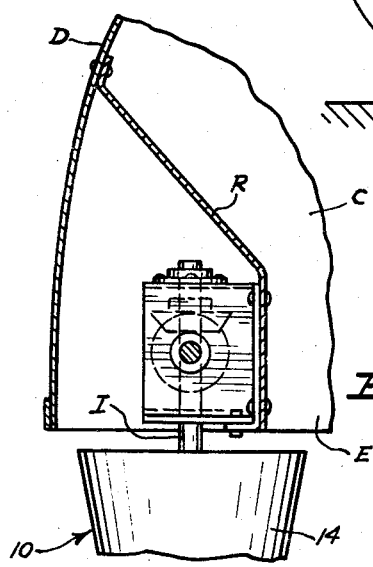
Fig. 4 is a detail longitudinal section on the line 4—4 in Fig. 2.

A straw spreader is ordinarily arranged below the rear of opening E and rotates in a horizontal plane about an upright axis, to engage the straw issuing from the opening and to cast the straw out evenly over the field surface. For driving the straw spreader there is a vertical spreader shaft I carried in bearings J on a cross member K at the rear of the opening E and this shaft I is driven by bevel gears L from a countershaft M also supported in bearings N on the cross member and extending outward through the rear lower corner of the hood at one side. The exposed end of this countershaft carries a belt pulley O driven by a belt P from a forwardly located power rotated drive pulley Q on the machine (Fig. 1), as is well known. Straw is kept out of the gears L by a shield R (Fig. 4) secured to the downwardly sloping top D of the hood and to the cross bracing assembly carrying the shafts, bearings and gears. In the ordinary machine, however, the straw spreader per se is a rigid assembly (not here shown) of radially projecting arms secured to the shaft I and usually with a circular hub plate of large diameter, this assembly rotating below the opening E as is well known in the art. As a result vines, long tangled straw and like crop materials have a pronounced tendency to wind up on the spreader as aforesaid, in addition to which the spreader so obstructs the opening E that when it is desired to windrow the straw then the spreader must be entirely removed with an expenditure of considerable time and effort, as also aforesaid.

In accordance with my invention I provide a totally new type of straw spreader, designated generally at 10, which overcomes all of the previous difficulties encountered with this part of the harvester or combine. This straw spreader comprises a hub or hub member 11 secured to and rotated by the spreader shaft I just below the opening E at the rear thereof, and the hub member includes a sleeve 12 pinned or otherwise secured at 13 to the shaft, plus a hollow shell 14 which surrounds the shaft. Said shell 14 is larger than the shaft and is not cylindrical but tapers or diminishes in diameter in a downward direction. Pivot brackets 15 are secured at inner ends 16 to the sleeve 12 and at outer ends are fastened by L-shaped angles 17 to the lower end of the shell, these angles being riveted, as seen at 18, to the pivot brackets and interior of the lower end of the shell as best seen in Fig. 3. It will be seen that the pivot brackets 15, which function as hinges, are located not only below the shell 14 but within the outline of the smaller lower end thereof. In addition it will also be observed (Fig. 2) that the brackets 15 are radially disposed, are of inverted U-shape and are each provided with a pivot or hinge pin 19 which is located horizontally and on an axis at right angles to radii centered on the axis of rotation of the hub member 11 and shaft I.

Figure 5:
Fig. 5 is a still further enlarged detail cross section on the line 5—5 in Fig. 1.

The straw spreader is completed by a series of flail-like arms, or flails as they are hereinafter termed, designated at 20 and which are elongated strips of material pivoted at one end upon the aforesaid pins 19 to normally hang downwardly of their own weight bunched below the hub member 11 as seen in full lines in Fig. 1. While these flails 20 may be strips of any kind of material, including metal, I prefer to use a flexible or pliant and relatively soft material such as rubber with embedded fabric cords and of rectilinear cross section as seen in Fig. 5. In such case the pivoted ends of the flails are provided with apertured metal straps 21 riveted in place and pivoted between the depending portions of the aforesaid inverted U-shaped pivot brackets 15 as is clearly shown.

In the operation of this form of straw spreader, when the spreader shaft I is rotated then the flails will be swung apart, outwardly and upwardly to radial positions by the effects of centrifugal force, as seen in dotted lines in Fig. 1 and in full lines in Fig. 2. In such condition the flails will be rotated in a substantially horizontal plane, will engage the straw issuing from the opening E and will cast the straw outwardly over the field surface below. But because the hub member 11 tapers in a downward direction, and the flails are hinged or pivoted to swing downwardly, there will be much less tendency for vines, long straw and the like to wind about and wrap up on the spreader and less attention will be required on the part of the operator of the machine to keep the spreader cleared off and prevent clogging and possible damage to his machine. Additionally, if the flails are made of flexible and relatively soft material the spreader will be less dangerous and a careless operator is not so likely to be injured, flails of this nature having a slapping effect rather than a cutting action as is the case at present.

Furthermore when it is desired to windrow instead of spread the straw it is no longer necessary to remove the entire straw spreader from the machine. Since the hub member tapers downwardly and the flails when not rotated hang compactly bunched directly below the hub member the spreader will offer little or no obstruction to the windrowing of the straw. It is only necessary then to disable the drive to the spreader, as for example by disengaging belt P from the pulley O, and thus much time and work is saved.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For a combine having a hood and a straw discharge opening in the bottom thereof, a hub member, means rotatably supporting the said hub member below the said opening, a straw spreader which includes elongated flails and means pivoting each of the flails at one end to the hub member whereby they will normally swing downwardly of their own weight and hang bunched below the hub to offer minimum impediment to falling straw so that it will not wind upon the straw spreader, and means for rotating the hub member to cause the flails to swing apart and upward and travel in a substantially horizontal plane under the influence of centrifugal force, the said hub member having a hollow shell portion which tapers in a downward direction and the flails being pivoted to the lower end of said shell portion within the outline thereof.

2. A straw spreader for a grain harvesting machine which has a downwardly opening housing and a power driven shaft in said opening along with means delivering straw downward through the opening, comprising in combination, a spreader hub driven by the shaft and said hub tapering in a downward direction to tend to deliver the straw without winding on the hub, the hub therefore having a lower end smaller than its upper end, pivot brackets on the lower end of the hub within the sides thereof, and flails each pivoted at one end to one of the pivot brackets to normally of their own weight hang substantially straight down from the hub but operative in responsive to rotation of the hub and as a result of centrifugal force to swing upwardly and turn about in a substantially horizontal plane for spreading the straw issuing from the housing.

3. A straw spreader for a grain harvesting machine which has a downwardly opening housing and a power driven shaft in said opening along with means delivering straw downward through the opening, comprising in combination, a spreader hub driven by the shaft and said hub tapering in a downward direction to tend to deliver the straw without winding on the hub, the hub therefore having a lower end smaller than its upper end, pivot brackets on the lower end of the hub within the sides thereof, and flails each pivoted at one end to one of the pivot brackets to normally of their own weight hang substantially straight down from the hub but operative in response to rotation of the hub and as a result of centrifugal force to swing upwardly and turn about in a substantially horizontal plane for spreading the straw issuing from the housing, the said flails being pivoted to the pivot brackets on horizontal axes at right angles to radii centered on the axis of rotation of the hub.

4. A straw spreader for mounting below the straw discharge opening of a combine and upon the power rotated spreader shaft of the combine, comprising a hub member mounted upon the shaft and selectively rotatable thereby about an upright axis, a plurality of flail members, and means for pivoting one end of the flail members on said hub member for swinging movements in response to the effects of centrifugal force from hanging positions bunched below the hub member upward and apart to substantially horizontal positions, the said hub member comprising a sleeve secured to the spreader shaft, a downwardly tapering shell larger than and surrounding the shaft, and pivot brackets joining the sleeve and shell below the lower end of the latter and having means for pivotally mounting the said flail members.

References Cited in the file of this patent

UNITED STATES PATENTS

| | | |
|---|---|---|
| 797,073 | Perry | Aug. 15, 1905 |
| 1,959,689 | Ronning | May 22, 1934 |
| 2,250,948 | Garst | July 29, 1941 |
| 2,504,365 | Wallace | Apr. 18, 1950 |
| 2,532,238 | Malke | Nov. 28, 1950 |
| 2,712,944 | Stevens | July 12, 1955 |

FOREIGN PATENTS

| | | |
|---|---|---|
| 299,827 | Germany | Aug. 11, 1917 |